Jan. 28, 1969    R. K. JOHNSTON    3,424,809
SELECTIVE HYDROGENATION OF ACETYLENIC COMPOUNDS
Filed Nov. 14, 1966
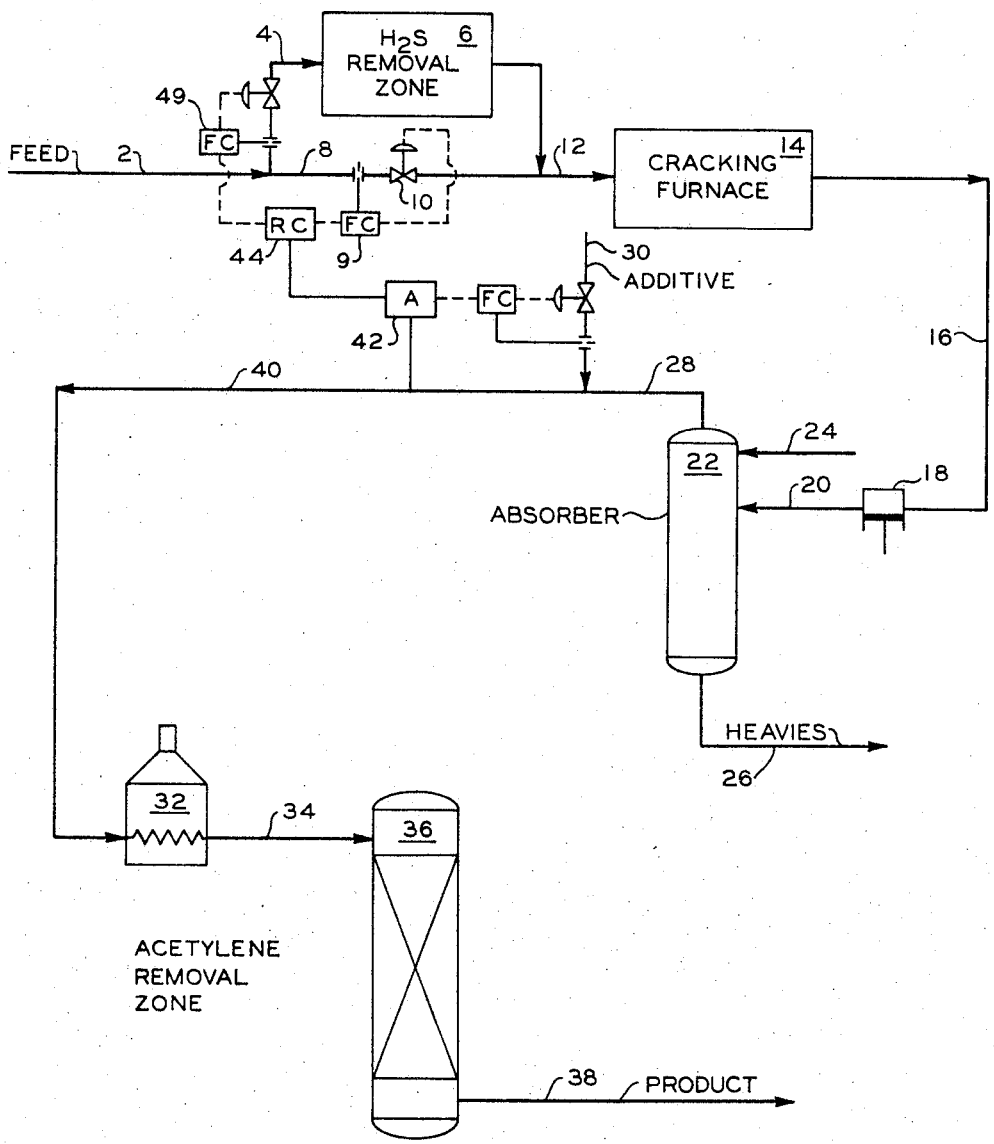
INVENTOR
R. K. JOHNSTON
BY Young & Quigg
ATTORNEYS United States Patent Office 3,424,809
Patented Jan. 28, 1969

3,424,809
SELECTIVE HYDROGENATION OF
ACETYLENIC COMPOUNDS
Robert K. Johnston, Phillips, Tex., assignor to Phillips
Petroleum Company, a corporation of Delaware
Filed Nov. 14, 1966, Ser. No. 593,961
U.S. Cl. 260—677                3 Claims
Int. Cl. C07c 5/08, 5/14, 5/16

ABSTRACT OF THE DISCLOSURE

A portion of a hydrocarbon stream containing an excessive amount of sulfur is passed through a sulfur removal zone and blended with the remainder to produce a stream with a sulfur content between 0.005 and 0.05 volume percent calculated as hydrogen sulfide for feed to a hydrogenation zone containing a cobalt, molybdenum and iron on alumina support hydrogenation catalyst, along with hydrogen and olefins. Because of the controlled sulfur content, the catalyst is very active in hydrogenating and thereby removing the acetylenes present without hydrogenating any substantial amount of the olefins present. In this manner, hydrocarbons cracked to produce ethylene can have the acetylenes removed without damage to the produced ethylene.

DISCLOSURE

This invention relates to selective hydrogenation of acetylenic compounds. In one of its aspects it relates to the selective hydrogenation of acetylenic compounds to olefinic compounds in the presence of olefinic compounds by passing a feed stream containing the acetylenic compounds and the olefinic compounds and a small percentage of a sulfur compound over a cobalt-molybdenum-ion catalyst.

Selective hydrogenation of acetylene and/or acetylenic compounds in the presence of olefins is a desirable process for reducing the acetylenic content of olefinic gases obtained from processes such as thermal or catalytic cracking of hydrocarbons. Many catalysts have been developed to selectively hydrogenate acetylene in the presence of olefin to olefinic compounds. Generally, the catalysts are too active and thereby hydrogenate the acetylene to paraffinic compounds and in addition also hydrogenate some olefins to paraffinic compounds. Other catalysts which have been developed are more selective yet not as active. They convert acetylenic compounds to olefinic compounds without converting a substantial portion of the olefinic compounds to paraffinic compounds; however the conversion is relatively small.

Redcay, 2,735,879, discloses a method of selectively hydrogenating acetylenic compounds in a cracked gas mixture containing such compounds and olefins such as ethylene by passing the compounds in the presence of hydrogen and added water vapor over a cobalt molybdate catalyst at a temperature in the range of about 350 to about 600° F. Reitmeier et al. disclosed in Chemical Engineering Progress (volume 54, No. 12) that the selectivity of these catalysts and other catalysts is increased as the sulfur content in the gas stream is increased. They further disclose that the activity of these catalysts as well as other catalysts are decreased as the sulfur content of the gas stream is increased.

Fleming 3,155,739 discloses that a gas mixture containing predominantly $C_2$ olefins and trace amounts of sulfur and acetylene can contact a cobalt sulfide catalyst to produce a purified gas containing acetylene in a concentration less than 10 parts per million. The sulfur constituent in the gas stream is in the range of about 1 to 20 parts per million.

Fleming et al. 3,205,281 disclose still a further method of selectively hydrogenating acetylenic compounds in a gas stream containing the same and olefins in which process the gas stream contacts a catalyst comprising a calcined mixture of an oxide of a metal of the group consisting of cobalt nickel and an oxide of a metal of the group consisting of chromium and molybdenum supported on a carrier consisting essentially of anhydrous alpha aluminum, the contacting being at a temperature in the range of 250 to 600° F. at a pressure in the range of 50 to 250 p.s.i.g. The patentees disclose that their catalysts are effective in selectively hydrogenating acetylenic compounds in olefin gas streams to reduce the concentration of acetylene to 10 parts per million or lower with an organic sulfur content as high as 160 parts per million.

I have now discovered that a cobalt-molybdenum-iron catalyst supported on alumina is effective to reduce the acetylene concentration in a gas stream containing the same and a major portion of olefins when the acetylene containing gas stream has added thereto a small percentage of a sulfur containing compound.

By various aspects of this invention, one or more of the following, or other, objects can be obtained.

It is an object of this invention to provide an improved selective hydrogenation process for hydrogenating acetylenes to olefins in the presence of olefins without appreciable hydrogenation of olefins to paraffins.

It is a further object of this invention to provide a process for the selective hydrogenation of acetylenes in which the sulfur content in the feed stream to the hyrogenation zone is controlled within predetermined limits.

Other aspects, objects, and the several advantages of this invention are apparent to one skilled in the art from a study of this disclosure, the drawing, and the appended claims.

According to the invention, acetylenic compounds are selectively hydrogenated in the presence of olefins to olefinic compounds by passing a feed stream containing acetylenic compounds, olefinic compounds and a small amount of sulfur over an alumina supported cobalt-molybdenum-iron catalyst. The amount of sulfur in the feed stream is preferably maintained between 0.005 and .05 volume percent calculated as hydrogen sulfide. Preferably, the sulfur compound is hydrogen sulfide.

In one embodiment, the feed stream is obtained from a thermal cracking process and the selective hydrogenation takes place at a pressure in the range of 400 to 800 p.s.i.g., at a temperature in the range of 300 to 600° F. and at a gas space velocity of 2000 to 4000 volumes of gas per volume of catalyst per hour. Applicant has found that the combination of maintaining the feed stream at a temperature of 300 to 600° F., at a pressure of 400 to 800 p.s.i.g. in the presence of hydrogen will minimize coking and permit longer operation of the invention process without frequent regeneration. It has also been found that the aforementioned space velocity is sufficient to adequately selectively hydrogenate the acetylenic compounds at the specified temperature and pressure conditions without coking or hydrogenation of olefins to paraffins due to too great of a residence time of the feed in the reaction zone.

The catalyst of the invention can be supported on any suitable support such as alumina. The support can contain trace elements but these trace elements do not enter into the catalytic activity of the catalyst since they are, for the most part, not in contact with the feed material.

The invention will now be described with reference to the accompanying drawing which shows an embodiment of the invention.

Referring now to the drawing, a hydrocarbon feed stream which preferably is made up of the lower boiling paraffins, e.g., ethane, propane, and butanes, recovered from natural gas liquids or crude oil, and containing H₂S, is passed through line 2 and divided into a first stream 4 which passes through a H₂S removal zone 6 and a second stream 8 which by-passes the H₂S removal zone 6 and is combined with the effluent from the H₂S removal zone. The H₂S removal zone can be any suitable zone for removing H₂S from a gaseous feed stream. Suitable methods for removing H₂S from the feed stream include: passing the stream through an aqueous alkaline wash solution such as NaOH, Na₂CO₃, KOH, and the like; or through the alkanolamine wash solution such as the ethanolamines, e.g., diethanolamine, and the like.

The combined streams are passed through line 12 into a cracking furnace 14 wherein the feed is thermally cracked to produce an abundance of light hydrocarbons such as ethylene, propylene and the like. Also, unavoidably formed in the cracking furnace is a small amount of acetylene. The cracking furnace effluent is removed through line 16, compressed in 18, passed through line 20 to absorber 22 wherein the gas stream is countercurrently contacted with a selective solvent or absorbent, e.g. debutanized gasoline, which enters absorber 22 through line 24 and selectively removes C₃ and heavier compounds from the gas stream. The C₃ and heavier compounds with the selective solvent or absorbent is removed through line 26. The resulting gas stream containing hydrogen, methane, ethylene, ethane, acetylene and a small amount of a sulfur compound is passed through line 28 into furnace 32 and the stream is heated to a temperature in the range of 300 to 600° F. and is passed through line 34 through acetylene removal zone 36 wherein the gas stream is passed over a cobalt-molybdenum-iron catalyst which selectively hydrogenates acetylenic compounds, principally acetylene, to olefinic compounds, principally ethylene. The product containing principally ethylene is removed through line 38.

According to the invention, a predetermined amount of a sulfur compound, preferably H₂S, is maintained in the feed stream to the acetylene removal zone 36. The sulfur content is maintained between .005 and .05 volume percent of the feed stream. In accordance with one embodiment of the invention, a small portion of the feed stream in line 28 is removed from line 40 and passed through analyzer 42 to determine the sulfur content in the feed stream. Analyzer 42 can be any suitable analyzer which detects the presence and quantity of a sulfur compound in a feed stream. In accordance with the percent sulfur determined by analyzer 42, a signal is transmitted to ratio controller 44 which accordingly adjusts the ratio of feed passing through lines 4 and 8 by controlling opposite-acting valves in these lines, valve 10 in line 8 being controlled by flow controller 9 and the corresponding valve in line 4 being controlled by flow controller 49. If the sulfur content is too low, ratio controller 44 will operate to shut down the valve in line 4 somewhat and open up valve 10 somewhat to allow more feed which contains H₂S or other sulfur containing compounds to by-pass the H₂S removal zone.

Alternately, additives such as hydrogen sulfide or sulfur can be added through line 30. The amount of sulfur added through line 20 can be metered in accordance with the amount of sulfur which is found by analyzer 42 to be present in stream 28. If the amount of sulfur in line 28 falls below a predetermined amount, analyzer 42 will open a valve in line 30 slightly to allow more hydrogen sulfide or a sulfur compound to be added to stream 28 thereby bringing stream 28 into the desired sulfur containing range. Stream 30 passes through line 40, heater 32, line 34 into hydrogenation zone 36 where the acetylenes are hydrogenated to form product 38.

Cracking furnace 14 can be any suitable cracking furnace which operates under suitable conditions to thermally crack the hydrocarbon components to produce a predominance of ethylene. A suitable cracking process is described and claimed in U.S. 2,813,920.

The selective solvent or absorber used in zone 24 can be any suitable solvent or absorbent such as debutanized gasoline.

The heating furnace 32 can be any suitable furnace which heats the gaseous mixture up to the desired temperature. A tube type furnace would be a suitable furnace.

It has been found that the amount of acetylene in the product stream 38 can be substantially reduced without decreasing the amount of ethylene with the use of a cobalt-molybdenum-iron type hydrogenation catalyst in acetylene removal zone 36 by maintaining the pressure in the removal zone 36 in the range of about 400 to 800 p.s.i.g., the temperature in the range of 300 to 600° F. and the gas space velocity in the range of about 2000 to 4000 volumes of gas per volume of catalyst per hour. The sulfur content, preferably H₂S, is most desirably maintained at about .01 volume percent.

The invention will be exemplified by the following specific example.

Example

A gas stream containing hydrogen, methane, ethylene, ethane and acetylene was passed over a cobalt-molybdenum-iron acetylene hydrogenation catalyst supported on alumina, the cobalt, molybdenum, and iron being present in the weight percentages of 1.50, .15 and .20, respectively. The second feed stream containing hydrogen, methane, ethylene, ethane and acetylene had added to it about 0.01 volume percent of H₂S, and the combined stream was passed over the same catalyst as the first feed stream. The conditions in the hydrogenation zone were maintained at a pressure of 750 p.s.i.g., a temperature of 450° F. and a gas space velocity of 3000 volumes of gas per volume of catalyst per hour. The H₂S in the second feed stream was maintained at all times between .005 and .05 volume percent of the feed. The results of the two effluent streams are given below in Table I.

TABLE I

| Gas volumes of components | Feed to catalyst | | Product from catalyst | |
|---|---|---|---|---|
| | 1 | 2 | 1 | 2 |
| Hydrogen | 14.0 | 14.0 | 14.0 | 14.0 |
| Methane | 35.7 | 35.7 | 35.7 | 35.7 |
| Ethylene | 27.6 | 27.6 | 27.7 | 27.8 |
| Ethane | 6.3 | 6.3 | 6.3 | 6.3 |
| Total | 83.6 | 83.6 | 83.7 | 83.8 |
| H₂S | | .01 | | .01 |
| Acetylene | 0.20 | 0.20 | 0.10 | 0.01 |

It can be seen from the above data that the addition of a small amount, specifically .012 volume percent of H₂S to the hydrogenation feed stream increases the selectivity of the catalyst for hydrogenating acetylene to ethylene. The increase is about 100 percent improvement over the hydrogenation without sulfur and also reduces the acetylene in the product stream to about ¹⁄₁₀ of that produced without the sulfur. Further, the acetylene removal, which according to the invention, brings the acetylene down to amounts of less than about 125 parts per million, does not decrease the percentage of ethylene in the product stream.

While the invention has been described with regard to continuously adding the sulfur compound to the feed stream, it is within the scope of the invention to sulfide the catalyst in a batch operation. For example, it has been found that by adding .5 to 1.0 volume percent of H₂S to the feed stream for a period of 4 to 6 hours, the catalyst will be sufficiently sulfided for 92 to 95 percent acetylene removal for a period of 3 to 4 weeks.

Reasonable variation and modification are possible within the scope of the foregoing disclosure, the drawing, and the claims to the invention without departing from the spirit thereof.

I claim:

1. In a process for selectively hydrogenating acetylene present in an olefin and hydrogen containing stream comprising adding to said stream a sulfur compound, passing said stream containing said sulfur compound to a catalytic reaction zone and therein contacting said stream with a catalyst consisting essentially of cobalt, molybdenum and iron on an alumina support at a temperature, a pressure and a gas space velocity sufficient to carry out the selective hydrogenation process wherein said olefin containing stream is obtained from a sulfur containing hydrocarbon feed stream to a thermal cracking zone wherein said hydrocarbons in said feed stream are cracked to produce ethylene, hydrogen and unavoidably some acetylene, the effluent from the cracking zone is compressed and passed to an absorber tower wherein $C_3$ and heavier hydrocarbons are selectively removed from said stream with a selective solvent, and the resulting gas stream from said absorber zone is heated to a temperature in the range of 300 to 600° F., the improvement comprising passing a first portion of said hydrocarbon feed stream to said cracking zone through a sulfur removal zone wherein sulfur is removed from said sulfur containing hydrocarbon feed stream, combining the effluent from said sulfur removal zone with a second portion of said hydrocarbon feed stream, analyzing the sulfur content of said olefin containing stream at a point prior to the introduction of said stream into said hydrogenation zone, and passing the amount of said first hydrocarbon stream to said sulfur removal zone adjusted in accordance with the analysis to maintain the sulfur content of said stream between 0.005 and 0.05 volume percent calculated as hydrogen sulfide.

2. A process according to claim 1 wherein the pressure in said hydrogenation zone is maintained at about 750 p.s.i.g., the temperature is maintained at about 450° F. and the gas space velocity is maintained at about 3000 volumes of gas per volume of catalyst per hour.

3. A process according to claim 2 wherein said sulfur is present as $H_2S$ which is maintained at about .01 volume percent of said feed to said hydrogenation zone.

References Cited

UNITED STATES PATENTS

| | | | |
|---|---|---|---|
| 2,511,453 | 6/1950 | Barry | 260—677 |
| 2,880,171 | 3/1959 | Flinn et al. | 252—470 |
| 2,871,182 | 1/1959 | Weekman | 208—57 |
| 3,167,497 | 1/1965 | Solomon | 252—439 |
| 3,205,180 | 9/1965 | Demeester | 252—465 |
| 3,320,155 | 5/1967 | Kelley | 260—683.65 |

DELBERT E. GANTZ, *Primary Examiner.*

HERBERT LEVINE, *Assistant Examiner.*

U.S. Cl. X.R.

208—67, 101; 252—465, 470; 260—683